(12) United States Patent
Chung et al.

(10) Patent No.: US 9,231,688 B2
(45) Date of Patent: Jan. 5, 2016

(54) APPARATUS AND METHOD FOR WIRELESS RELAYING

(75) Inventors: Jae Ho Chung, Seoul (KR); Byung Wan Yoon, Gunpo-si (KR); Yung Ha Ji, Seongnam-si (KR); Kyu Jeong Han, Suwon-si (KR)

(73) Assignee: KT Corporation, Seongnam (KR)

( * ) Notice: Subject to any disclaimer, the term of this patent is extended or adjusted under 35 U.S.C. 154(b) by 114 days.

(21) Appl. No.: 14/111,472

(22) PCT Filed: Oct. 19, 2011

(86) PCT No.: PCT/KR2011/007796
§ 371 (c)(1),
(2), (4) Date: Nov. 5, 2013

(87) PCT Pub. No.: WO2012/141398
PCT Pub. Date: Oct. 18, 2012

(65) Prior Publication Data
US 2014/0057556 A1 Feb. 27, 2014

(30) Foreign Application Priority Data

Apr. 12, 2011 (KR) ........................ 10-2011-0033790

(51) Int. Cl.
*H04B 7/00* (2006.01)
*H04B 7/15* (2006.01)
*H04B 7/155* (2006.01)

(52) U.S. Cl.
CPC .............. *H04B 7/15* (2013.01); *H04B 7/15535* (2013.01)

(58) Field of Classification Search
CPC ........ H04B 3/36; H04B 7/15535; H04B 3/58; H04B 10/296; H04B 7/15578; H04B 10/2918
USPC ................................... 455/11.1, 13.1, 69, 522
See application file for complete search history.

(56) References Cited

U.S. PATENT DOCUMENTS

2009/0111399 A1* 4/2009 Norris et al. ............... 455/114.3

FOREIGN PATENT DOCUMENTS

| JP | 2010-103682 A | 5/2010 |
|---|---|---|
| KR | 2003-0051075 A | 6/2003 |
| KR | 10-2004-0047907 A | 6/2004 |
| KR | 10-2006-0097462 A | 9/2006 |
| KR | 10-2007-0031121 A | 3/2007 |

OTHER PUBLICATIONS

International Search Report in PCT/KR2011/007796 dated May 9, 2012 in PCT/KR2011/007796.
Korean Office Action dated Jul. 26, 2013 issued in Korean Patent Application No. 10-2011-0033790.

* cited by examiner

*Primary Examiner* — Tu X Nguyen
(74) *Attorney, Agent, or Firm* — Sughrue Mion, PLLC

(57) ABSTRACT

An apparatus for wireless relaying comprises: a transmission unit for generating a wireless signal; an amplification unit for amplifying and outputting the wireless signal; a conversion unit for converting the wireless signal into a digital signal; and an adjustment unit for adjusting the amplification ratio of the amplifying unit so that the difference between an output level value of the digital signal and a predetermined target power is lower than a predetermined numerical value.

8 Claims, 4 Drawing Sheets

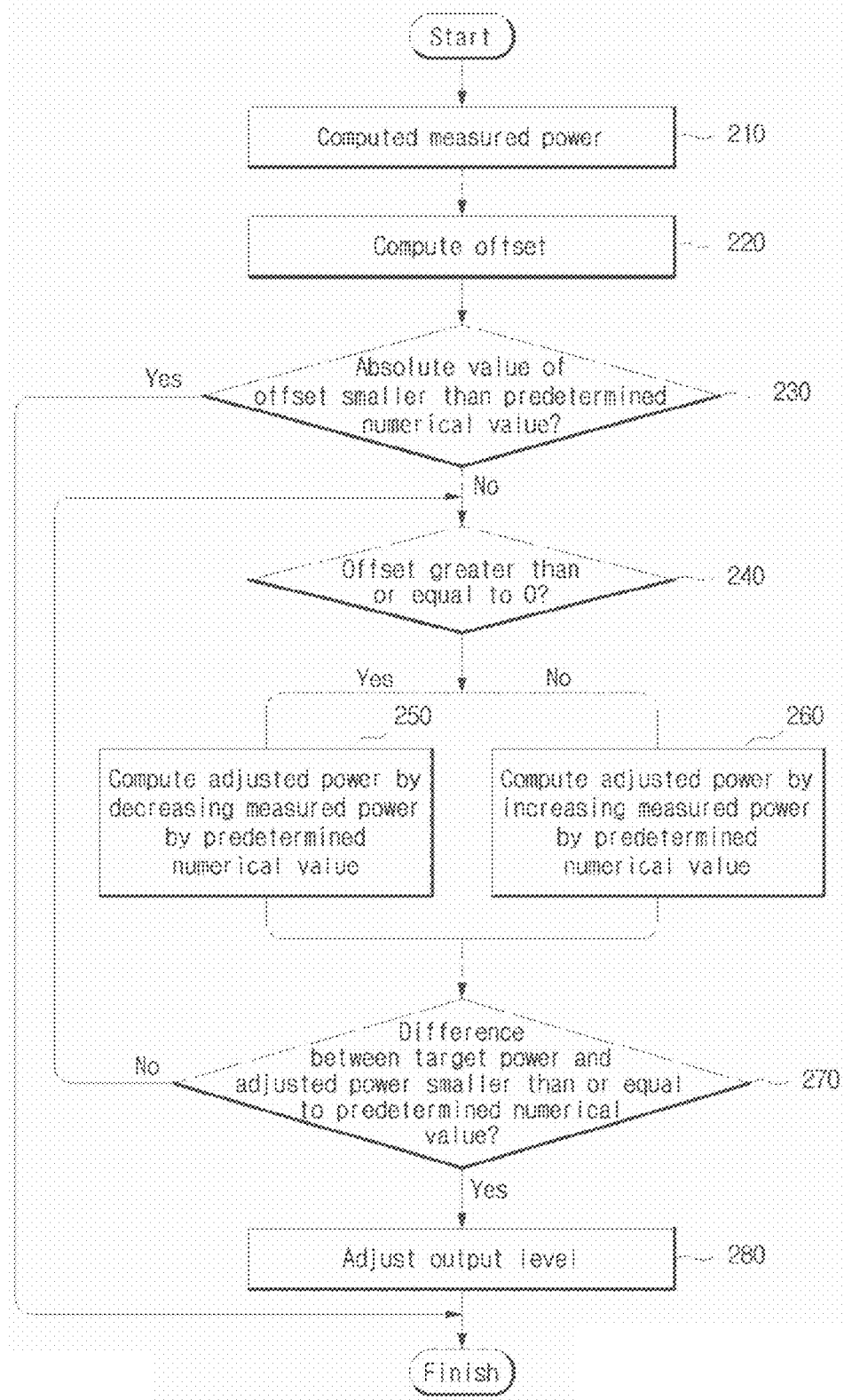

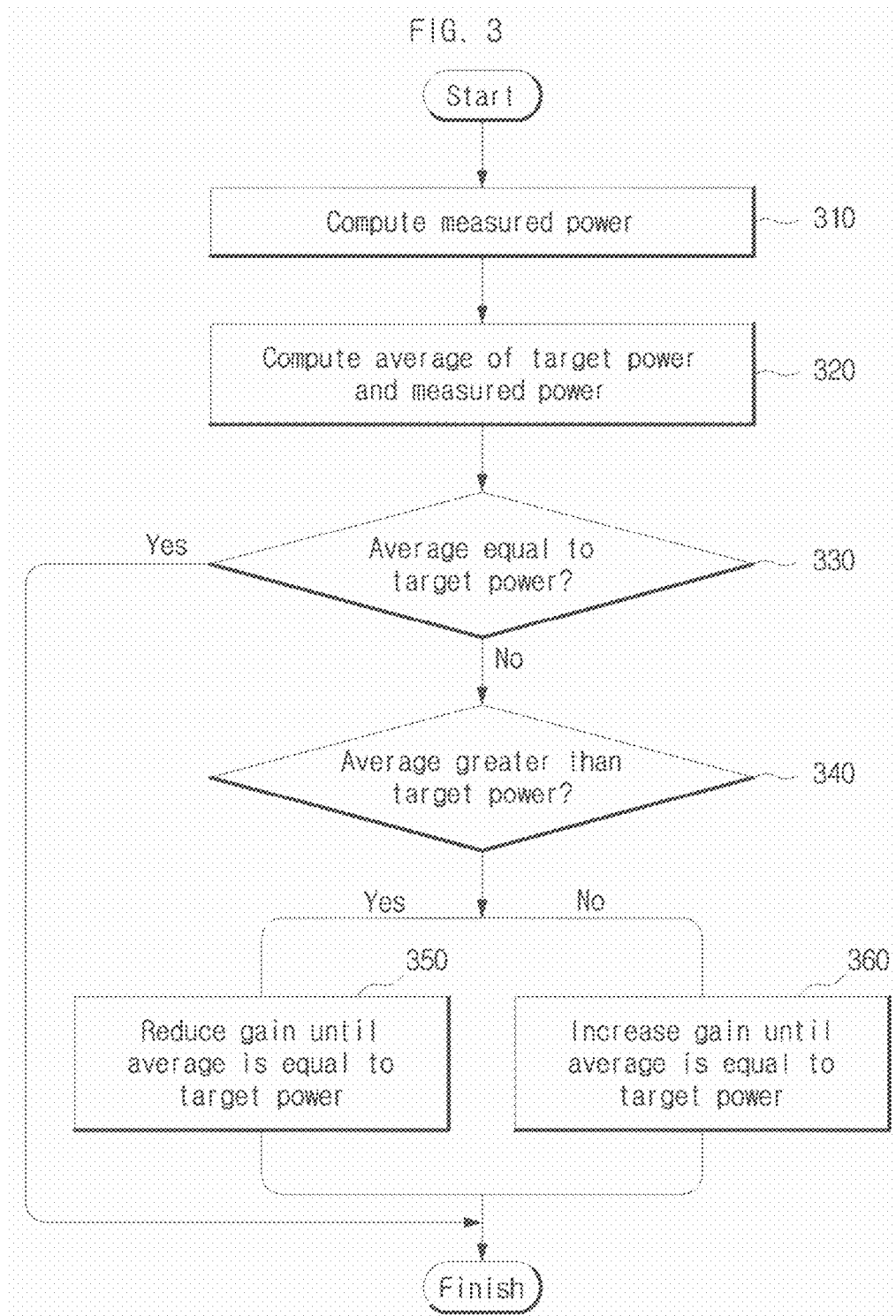

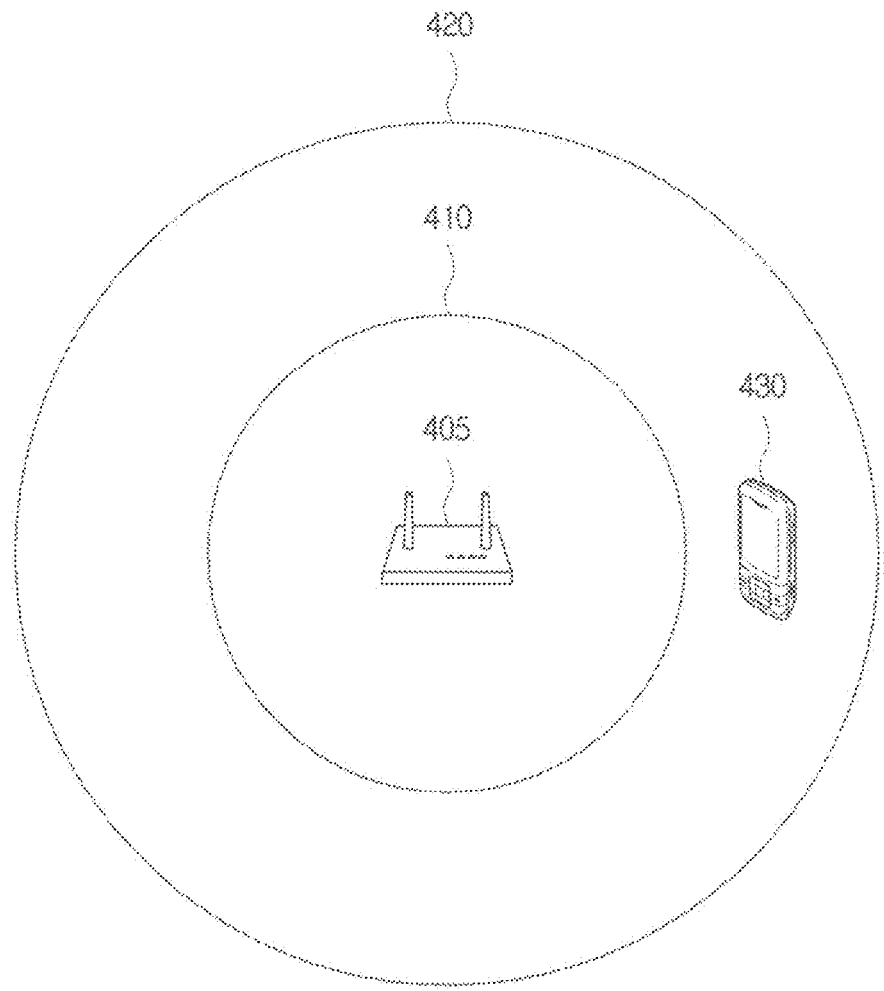

APPARATUS AND METHOD FOR WIRELESS RELAYING

RELATED APPLICATIONS

This is a national stage application of PCT/KR2011/0077196 filed on Oct. 19, 2011 which claims priority from Korean Patent Application No. 10-2011-0033790, filed on Apr. 12, 2012, in the Korean Intellectual Property Office, the disclosures of which are hereby incorporated herein in their entirety by reference.

BACKGROUND

1. Technical Field

The present invention relates to an apparatus for wireless relaying (access point) that provides a near field communication service.

2. Description of the Related Art

With the popularity of mobile communication devices, such as smartphones, notebook computers, etc., apparatuses for wireless relaying have been increasingly installed at more locations than ever in order to provide near field communication services. There can be a plural number of apparatuses for wireless relaying installed and operated in an arbitrary area, and a user terminal can select one of the plural apparatuses for wireless relaying to use a near field communication service.

However, when there are plural apparatuses for wireless relaying within a particular area, interference may occur in a wireless signal transmitted by each apparatus for wireless relaying. Accordingly, the apparatuses for wireless relaying should be installed at respective locations for which the coverage area of each apparatus for wireless relaying is considered. However, since the coverage area of the common apparatus for wireless relaying is inconsistent, there may be areas where a service by the apparatus for wireless relaying is available, or the coverage areas may be excessively overlapped to cause interferences, or some particular area may need to have an excessive number of apparatuses for wireless relaying installed therein.

SUMMARY

The present invention provides an apparatus for wireless relaying that can stabilize a current corresponding to a wireless signal.

An aspect of the present invention features an apparatus for wireless relaying, including: a transmission unit configured to generate a wireless signal; an amplification unit configured to amplify and output the wireless signal; a conversion unit configured to convert the wireless signal to a digital signal; and an adjustment unit configured to adjust an amplification ratio of the amplification unit so that a difference between an output level value of the digital signal and a predetermined target power becomes smaller than a predetermined numerical value.

Another aspect of the present invention features an apparatus for wireless relaying, including: a transmission unit configured to generate a wireless signal; an amplification unit configured to amplify and output the wireless signal; a conversion unit configured to convert the wireless signal to a digital signal; and an adjustment unit configured to adjust an amplification ratio of the amplification unit, if an average of an output level value of the digital signal and a predetermined target power is not equal to the target power, until the average becomes equal to the target power.

Yet another aspect of the present invention features a method for an apparatus for wireless relaying to relay a user terminal by use of a wireless signal, including: generating a wireless signal; amplifying and outputting the wireless signal; converting the wireless signal to a digital signal; and adjusting an amplification ratio so that a difference between an output level value of the digital signal and a predetermined target power becomes smaller than a predetermined numerical value.

Still another aspect of the present invention features a method for an apparatus for wireless relaying to relay a user terminal by use of a wireless signal, comprising: generating a wireless signal; amplifying and outputting the wireless signal; converting the wireless signal to a digital signal; and adjusting an amplification ratio, if an average of an output level value of the digital signal and a predetermined target power is not equal to the target power, until the average becomes equal to the target power.

BRIEF DESCRIPTION OF THE DRAWINGS

FIG. 2 is a flow diagram illustrating the operations for adjusting an output level of a wireless signal by an apparatus for wireless relaying in accordance with a first exemplary embodiment.

FIG. 3 is a flow diagram illustrating the operations for adjusting an output level of a wireless signal by an apparatus for wireless relaying in accordance with a second exemplary embodiment.

FIG. 4 shows an example of coverage of a wireless signal provided by the apparatus for wireless relaying.

DETAILED DESCRIPTION

Figure 1:
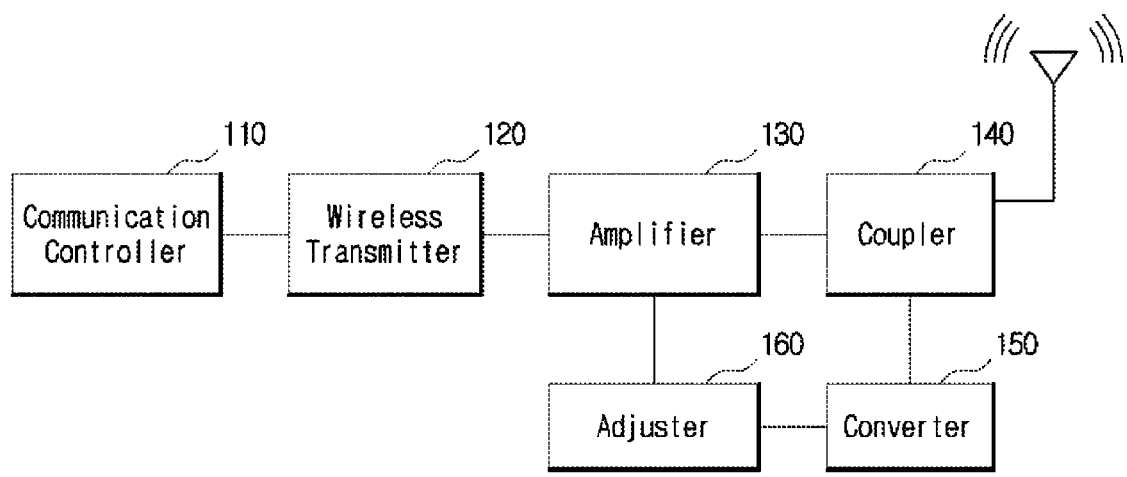
FIG. 1 is a block diagram briefly illustrating an apparatus for wireless relaying.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

When one element is described to "transmit" or "send" a signal to another element, it shall be construed as transmitting or sending the signal to the other element by being directly connected to the other element but also as possibly transmitting or sending the signal by way of another element in between, unless disclosed otherwise.

FIG. 1 is a block diagram briefly illustrating an apparatus for wireless relaying.

Referring to FIG. 1, the apparatus of wireless relaying includes a communication controller 110, a wireless transmitter 120, an amplifier 130, a coupler 140, a converter 150 and an adjuster 160.

The communication controller 110 relays data transmission between each user terminal connected to the apparatus for wireless relaying and devices connected to the apparatus for wireless relaying. For example, the communication controller 110 can transmit data received through a communication network connected with the apparatus for wireless relaying to the wireless transmitter 120 to have the data transmitted to a user terminal through a wireless signal.

The wireless transmitter 120 generates a wireless signal including the data received from the communication controller 110. The wireless transmitter 120 transmits the generated wireless signal to the amplifier 130.

The amplifier 130 amplifies the wireless signal and outputs the amplified wireless signal through an antenna. The amplifier 130 can adjust the power corresponding to the wireless signal by adjusting a gain. Here, the gain of the amplifier 130 can be adjusted by the adjuster 160, and the amplifier 130 varies the amplification ratio according to the adjusted gain and outputs the amplified wireless signal according to the adjusted amplification ratio.

The coupler 140 detects the wireless signal outputted from the amplifier 130 and transmits the wireless signal to the converter 150.

The converter 150 converts the wireless signal, which is an analog signal, to a digital signal. The converter 150 transmits the digital signal to the adjuster 160.

The adjuster 160 computes a gain based on an output level value of the digital signal. For instance, the adjuster 160 computes the gain according to a difference between the output level value of the digital signal (hence referred to as "measured power" hereinafter) and an output level value of the wireless signal to be finally outputted by the apparatus for wireless relaying (hence referred to as "target power" hereinafter). The steps for computing the gain by the adjuster 160 will be described later in detail with reference to FIGS. 2 and 3. The adjuster 160 adjusts the amplification ratio of the amplifier 130 based on the computed gain.

FIG. 2 is a flow diagram illustrating the steps for adjusting an output level of a wireless signal by the apparatus for wireless relaying in accordance with a first embodiment of the present invention.

In step 210, the adjuster 160 receives the digital signal from the converter 150 and computes the measured power, which is the output level value of the digital signal.

In step 220, the adjuster 160 computes an offset, which is a value having the measured power deducted from the target power.

In step 230, the adjuster 160 determines whether an absolute value of the offset is smaller than a predetermined numerical value.

In step 230, if the absolute value of the offset is smaller than or equal to the predetermined numerical value, the adjuster 160 terminates the adjusting of the output level of the wireless signal.

If the absolute value of the offset is greater than the predetermined numerical value in step 230, the adjuster 160 determines, in step 240, whether the offset is 0 or greater.

If the offset is greater than or equal to 0 in step 240, the adjuster 160 computes, in step 250, an adjusted power by reducing the measured power by the predetermined numerical value.

If the offset is smaller than 0 in step 240, the adjuster 160 computes, in step 260, the adjusted power by increasing the measured power by the predetermined numerical value.

In step 270, the adjuster 160 determines whether a difference between the target power and the adjusted power is smaller than or equal to a predetermined numerical value.

If the difference between the target power and the adjusted power is greater than the predetermined numerical value in step 270, the adjuster 160 sets the offset according to the target power and the adjusted power, and repeats the steps, from step 240.

If the difference between the target power and the adjusted power is smaller than or equal to the predetermined numerical value in step 270, the adjuster 160 computes a gain corresponding to the adjusted power, controls the amplifier 130 according to the computed gain, and adjusts the output level of the wireless signal in step 280.

FIG. 3 is a flow diagram illustrating the steps for adjusting an output level of a wireless signal by the apparatus for wireless relaying in accordance with a second embodiment of the present invention.

Referring to FIG. 3, in step 310, the adjuster 160 receives a digital signal from the converter 150 and computes a measured power, which is an output level value of the digital signal.

In step 320, the adjuster 160 computes an average of a target power and the measured power. With respect to the description of the remaining operations in FIG. 3, the average of target power and the measured power will be referred to simply as the "average".

In step 330, the adjuster 160 determines whether the average computed in step 320 is the same as the target power.

In step 330, if the average is the same as the target power, the adjuster 160 terminates the output level adjusting step of the wireless signal.

In step 340, if the average is different from the target power, the adjuster 160 determines whether the average is greater than the target power.

If the average is greater than the target power in step 340, the adjuster 160 controls, in step 350, the amplifier 130 so that the gain is reduced by a predetermined numerical value until the average becomes equal to the target power. That is, after reducing the gain by the predetermined numerical value, the adjuster 160 repeats the step of reducing the gain by the predetermined numerical value if the average is not equal to the target power. When the average becomes equal to the target power after the gain is reduced by the predetermined numerical value, the adjuster 160 terminates the output level adjusting step of the wireless signal.

If the average is smaller than the target power in step 340, the adjuster 160 controls, in step 360, the amplifier 130 so that the gain is increased by the predetermined numerical value until the average becomes equal to the target power. That is, after increasing the gain by the predetermined numerical value, the adjuster 160 repeats the step of increasing the gain by the predetermined numerical value if the average is not equal to the target power. When the average becomes equal to the target power after the gain is increased by the predetermined numerical value, the adjuster 160 terminates the output level adjusting step of the wireless signal.

Hereinafter, an effect provided by outputting the wireless signal with certain coverage by the apparatus for wireless relaying will be described. FIG. 4 shows an example of coverage of the wireless signal provided by the apparatus for wireless relaying.

In case the coverage area of the apparatus for wireless relaying is inconsistent, the user terminal needs to attempt to access the apparatus for wireless relaying repeatedly, pursuant to variations of the coverage area. For instance, if it is assumed that coverage of an apparatus 405 for wireless relaying changes between first coverage 410 and second coverage 420, a user terminal 430 can be disconnected from the apparatus 405 for wireless relaying when the coverage of the apparatus 405 for wireless relaying extends only to the edge of first coverage 410 and can be connected with the apparatus 405 for wireless relaying when the coverage of the apparatus 405 for wireless relaying is up to the second coverage 420. When the coverage of the apparatus 405 for wireless relaying is inconsistent, as described above, the user terminal 430 that is located near boundaries of the coverage may continually disconnect and access the apparatus 405, making it difficult to continuously provide a near field communication service.

Moreover, since the coverage needs to be considered, the apparatus 405 for wireless relaying needs to be installed based on the first coverage 410. Accordingly, the coverage of the apparatus 405 for wireless relaying overlaps with other areas because there are instances where the coverage actually changes to the second coverage 420.

Therefore, by making the coverage consistent, the apparatus for wireless relaying in accordance with the first embodiment and the second embodiment of the present invention can prevent the user terminal from repeatedly disconnecting from and accessing the apparatus for wireless relaying, and the locations for installing the apparatus for wireless relaying can be readily configured.

Through the above-described steps, the apparatus for wireless relaying in accordance with the first and second embodiments of the present invention can provide a wireless signal having consistent coverage, preventing the user terminal from attempting to repeatedly access the apparatus for wireless relaying due to variations of the coverage.

Hitherto, the present invention has been described in accordance with certain embodiments, but there are many other embodiments in the claims of the present invention in addition to the embodiments described above. Anyone having ordinary skill in the art to which the present invention pertains shall be able to understand that the present invention can be embodied in modified forms without departing from the essential features of the present invention. Accordingly, the disclosed embodiments shall be understood in illustrative views, not in restrictive views. The scope of the present invention shall be defined by the appended claims, not by the above description, and any and all differences within the equivalent scope shall be understood to be included in the present invention.

What is claimed is:

1. An apparatus for wireless relaying, comprising:
   a transmission unit configured to generate a wireless signal;
   an amplification unit configured to amplify and output the wireless signal;
   a conversion unit configured to convert the wireless signal to a digital signal; and
   an adjustment unit connected to the amplification unit and configured to provide an adjustment to the amplification unit in order to adjust an amplification ratio of the amplification unit so that a difference between an output level value of the digital signal and a predetermined target power becomes smaller than a predetermined numerical value.

2. The apparatus of claim 1, wherein, if an absolute value of the difference between the output level value of the digital signal and the predetermined target power is greater than the predetermined numerical value, the adjustment unit computes an adjusted power by increasing or reducing the output level value of the digital signal by a predetermined value.

3. The apparatus of claim 2, wherein, if an absolute value of a difference between the adjusted power and the target power is greater than the predetermined numerical value, the adjusted power is increased or reduced by a predetermined value.

4. The apparatus of claim 3, wherein the adjustment unit is configured to compute a gain corresponding to the adjusted power and to adjust the amplification ratio of the amplification unit according to the gain.

5. An apparatus for wireless relaying, comprising:
   a transmission unit configured to generate a wireless signal;
   an amplification unit configured to amplify and output the wireless signal;
   a conversion unit configured to convert the wireless signal to a digital signal; and
   an adjustment unit connected to the amplification unit and configured to provide an adjustment to the amplification unit in order to adjust an amplification ratio of the amplification unit, if an average of an output level value of the digital signal and a predetermined target power is not equal to the target power, until the average becomes equal to the target power.

6. A method for an apparatus for wireless relaying to relay a user terminal by use of a wireless signal, comprising:
   generating a wireless signal;
   amplifying, by an amplification unit, and outputting the wireless signal;
   converting the wireless signal to a digital signal; and
   adjusting, by an adjustment unit, an amplification ratio so that a difference between an output level value of the digital signal and a predetermined target power becomes smaller than a predetermined numerical value,
   wherein the adjustment unit is connected to the amplification unit and is configured to provide an adjustment to the amplification unit in order to adjust the amplification ratio.

7. The method of claim 6, wherein the adjusting of the amplification ratio comprises:
   computing an adjusted power by increasing or reducing the output level value of the digital signal by a predetermined value if an absolute value of the difference between the output level value of the digital signal and the target power is greater than the predetermined numerical value;
   increasing or reducing the adjusted power by a predetermined value if an absolute value between the adjusted power and the target power is greater than the predetermined numerical value; and
   computing a gain corresponding to the adjusted power and adjusting the amplification ratio.

8. A method for an apparatus for wireless relaying to relay a user terminal by use of a wireless signal, comprising:
   generating a wireless signal;
   amplifying, by an amplification unit, and outputting the wireless signal;
   converting the wireless signal to a digital signal; and
   adjusting, by an adjustment unit, an amplification ratio, if an average of an output level value of the digital signal and a predetermined target power is not equal to the target power, until the average becomes equal to the target power,
   wherein the adjustment unit is connected to the amplification unit and is configured to provide an adjustment to the amplification unit in order to adjust the amplification ratio.

* * * * *